US009958617B2

(12) United States Patent
Koch

(10) Patent No.: US 9,958,617 B2
(45) Date of Patent: May 1, 2018

(54) CONNECTOR

(71) Applicant: NEUTRIK AG, Schaan (LI)

(72) Inventor: Matthias Koch, Gotzis (AT)

(73) Assignee: Neutrik AG, Schaan (LI)

(*) Notice: Subject to any disclaimer, the term of this patent is extended or adjusted under 35 U.S.C. 154(b) by 25 days.

(21) Appl. No.: 15/405,868

(22) Filed: Jan. 13, 2017

(65) Prior Publication Data
US 2017/0212308 A1 Jul. 27, 2017

(30) Foreign Application Priority Data

Jan. 25, 2016 (DE) .................... 10 2016 101 254

(51) Int. Cl.
*G02B 6/38* (2006.01)
*H01R 13/05* (2006.01)
(Continued)

(52) U.S. Cl.
CPC ......... *G02B 6/3817* (2013.01); *G02B 6/3821* (2013.01); *G02B 6/3849* (2013.01);
(Continued)

(58) Field of Classification Search
CPC .. G02B 6/3817; G02B 6/3821; G02B 6/3849; G02B 6/3893; G02B 6/3894;
(Continued)

(56) References Cited

U.S. PATENT DOCUMENTS 4,176,897 A * 12/1979 Cameron ............... H01R 13/44
439/137
4,657,327 A * 4/1987 Weingartner .......... H01R 13/28
439/289
(Continued)

FOREIGN PATENT DOCUMENTS

CH 683646 4/1994
DE 3112078 10/1982
(Continued)

OTHER PUBLICATIONS

Marshall Electronics Cables & Connectors Division, Tajimi Optical Connectors, pp. 1-3, Dec. 14, 2015.
(Continued)

*Primary Examiner* — Peter Radkowski
(74) *Attorney, Agent, or Firm* — Volpe and Koeing, P.C.

(57) ABSTRACT

A connector (1), in particular cable connector, for producing an optical and electrical connection to a mating connector (2). The connector (1) has a connector main housing (3) and at least one housing attachment part (4) and at least one optical waveguide carrier (5), and the housing attachment part (4) is fastened or fastenable releasably to the connector main housing (3) by a releasable and reconnectable connecting device (6). The optical waveguide carrier (5) and at least one electric contact (7) are arranged on the connector main housing (3), and the housing attachment part (4) has at least one electric extension contact (8) which is connectable to the electric contact (7) of the connector main housing (3) by connection of the housing attachment part (4) to the connector main housing (3).

10 Claims, 5 Drawing Sheets

(51) Int. Cl.
*H01R 13/502* (2006.01)
*H01R 13/622* (2006.01)
*H01R 24/28* (2011.01)
*H01R 107/00* (2006.01)
*H01R 13/04* (2006.01)
*H01R 13/512* (2006.01)
*H01R 13/52* (2006.01)

(52) U.S. Cl.
CPC ......... *G02B 6/3893* (2013.01); *G02B 6/3894* (2013.01); *H01R 13/052* (2013.01); *H01R 13/502* (2013.01); *H01R 13/622* (2013.01); *H01R 13/04* (2013.01); *H01R 13/512* (2013.01); *H01R 13/5213* (2013.01); *H01R 24/28* (2013.01); *H01R 2107/00* (2013.01)

(58) Field of Classification Search
CPC .. H01R 13/052; H01R 13/502; H01R 13/622; H01R 24/28; H01R 2207/00
See application file for complete search history.

(56) References Cited

U.S. PATENT DOCUMENTS

| | | | | |
|---|---|---|---|---|
| 5,716,224 | A * | 2/1998 | Masuda | H01R 13/4536 439/138 |
| 5,881,191 | A * | 3/1999 | Liberty | G02B 6/3897 385/134 |
| 6,004,147 | A * | 12/1999 | Don-Yehiya | G02B 6/3849 439/138 |
| 6,079,881 | A * | 6/2000 | Roth | G02B 6/3825 385/139 |
| 6,467,970 | B1 * | 10/2002 | Carberry | G02B 6/3897 385/56 |
| 7,857,524 | B2 * | 12/2010 | Dobler | G02B 6/3849 385/69 |
| 8,083,416 | B2 * | 12/2011 | Scadden | G02B 6/3817 385/53 |
| 8,506,173 | B2 * | 8/2013 | Lewallen | G02B 6/3817 385/53 |
| 8,573,861 | B2 * | 11/2013 | Terlizzi | G02B 6/3817 385/88 |
| 8,651,750 | B2 * | 2/2014 | Terlizzi | G02B 6/3817 385/147 |
| 8,678,666 | B2 * | 3/2014 | Scadden | G02B 6/3817 385/55 |
| 2007/0105432 | A1 * | 5/2007 | Muhs | G02B 6/3879 439/492 |
| 2009/0269011 | A1 * | 10/2009 | Scadden | G02B 6/3817 385/65 |
| 2010/0014812 | A1 * | 1/2010 | Dobler | G02B 6/3849 385/70 |
| 2011/0116747 | A1 * | 5/2011 | Terlizzi | G02B 6/3817 385/75 |
| 2011/0116750 | A1 * | 5/2011 | Terlizzi | G02B 6/3817 385/88 |
| 2012/0237167 | A1 * | 9/2012 | Lu | G02B 6/3817 385/56 |
| 2012/0301081 | A1 * | 11/2012 | Affre De Saint Rome | G02B 6/3849 385/56 |
| 2014/0205240 | A1 * | 7/2014 | Scadden | G02B 6/3817 385/56 |
| 2014/0294348 | A1 * | 10/2014 | Ishiguro | G02B 6/3893 385/58 |
| 2015/0293310 | A1 * | 10/2015 | Kanno | G02B 6/3891 385/78 |
| 2016/0154185 | A1 * | 6/2016 | Mori | G02B 6/3853 385/56 |

FOREIGN PATENT DOCUMENTS

| | | |
|---|---|---|
| DE | 10047898 | 4/2002 |
| DE | 102004025512 | 12/2005 |
| DE | 60024201 | 8/2006 |
| DE | 202008005461 | 8/2008 |
| DE | 102010039715 | 3/2012 |
| EP | 1091225 | 11/2005 |
| EP | 1598685 | 11/2005 |
| EP | 1777562 | 4/2007 |
| EP | 1912085 | 4/2008 |
| EP | 2424048 | 2/2012 |
| FR | 2799888 | 4/2011 |
| WO | 2013106183 | 7/2013 |
| WO | 2014186436 | 11/2014 |
| WO | 2015033613 | 3/2015 |
| WO | 2015120365 | 8/2015 |

OTHER PUBLICATIONS

Tajimi Connectors, 2005 Catalogue, Tajimi Electronics Co., Ltd., 30 pages, Jan. 1, 2005.

Miniature Rectangular Connector 3RT01 series, Tajimi Electronics Co., Ltd, Apr. 2004.

Neutrik Handling instruction opticalCON, Fiber Optic Connection, 2 pgs., Aug. 27, 2012.

Fischer Fiberoptic Series, Fischer Connectors, Catalogue, 7 pages, Sep. 2015.

Fisher Connectors Headquarters, Fischer Connectors, 1 pg., Mar. 2014.

Neutrik opticalCON, 28 page Catalogue, Feb. 2010.

Neutrik AG, Data Connectors, Catalogue pp. 83 to 93, Feb. 20, 2014.

* cited by examiner

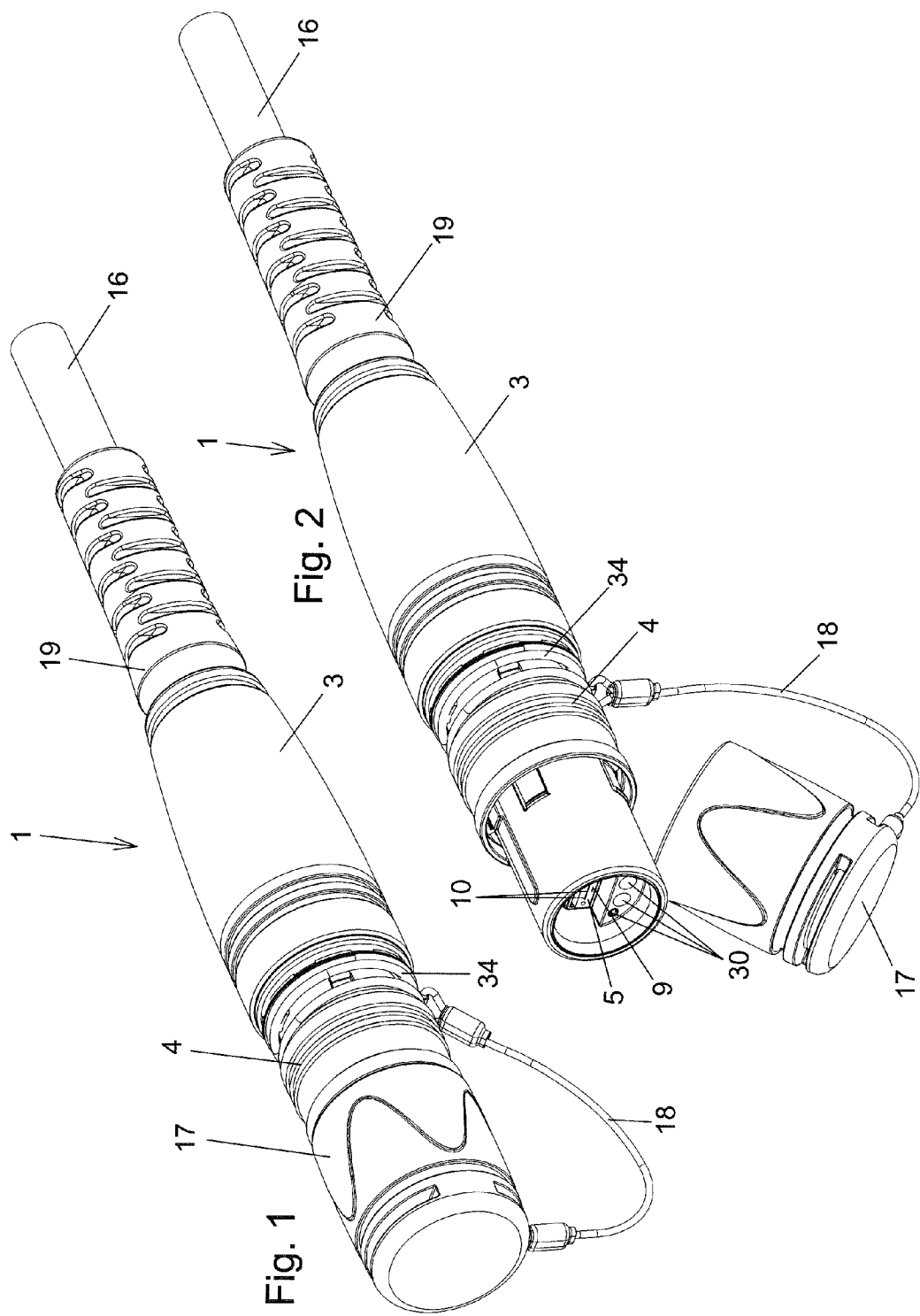

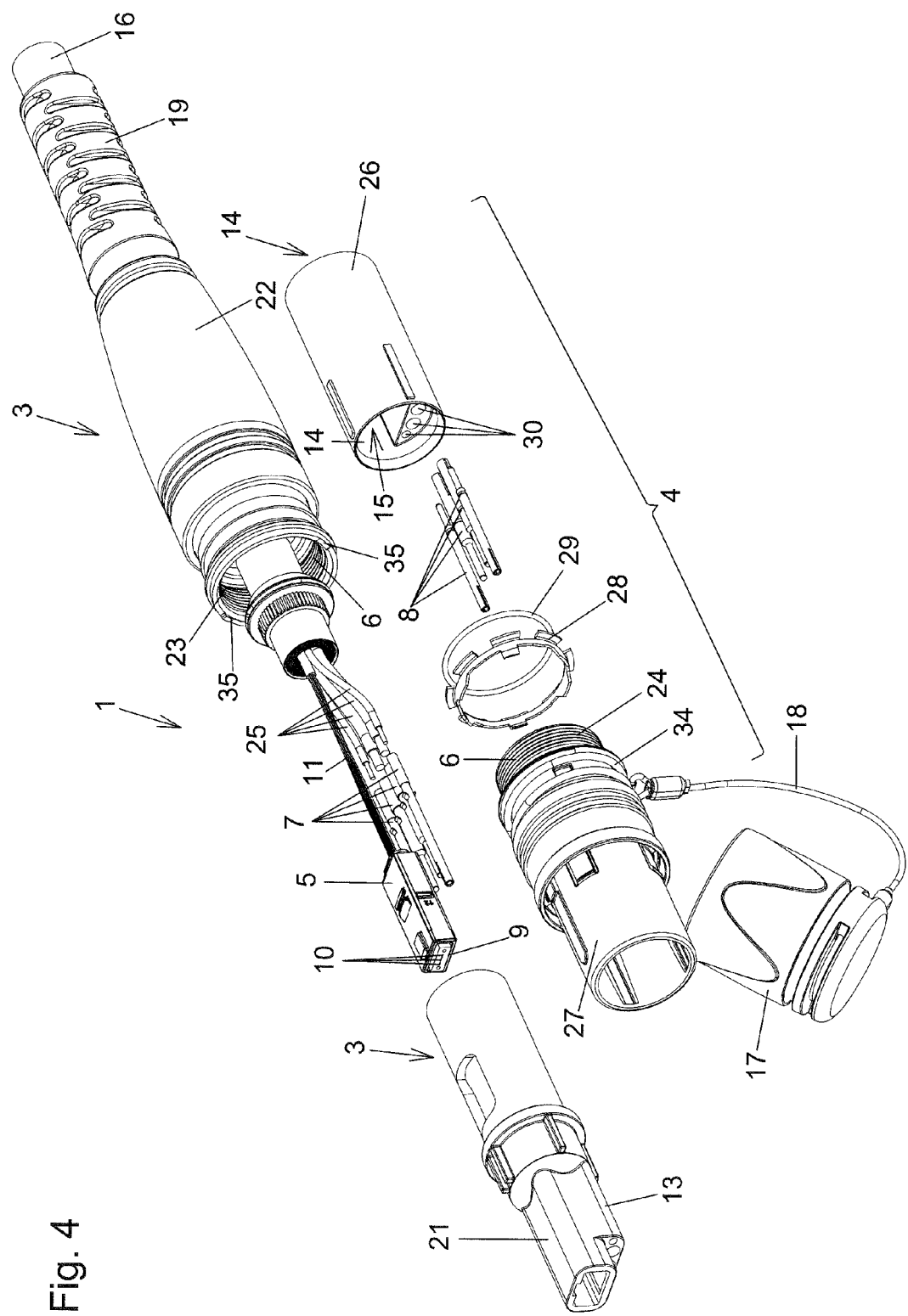

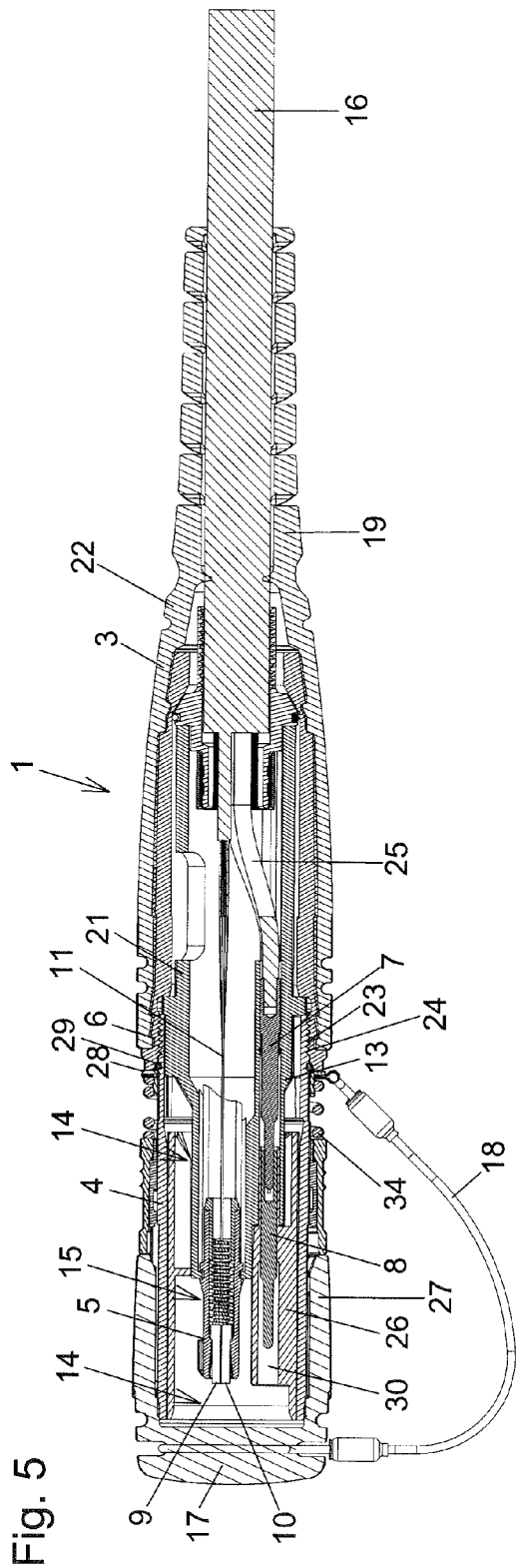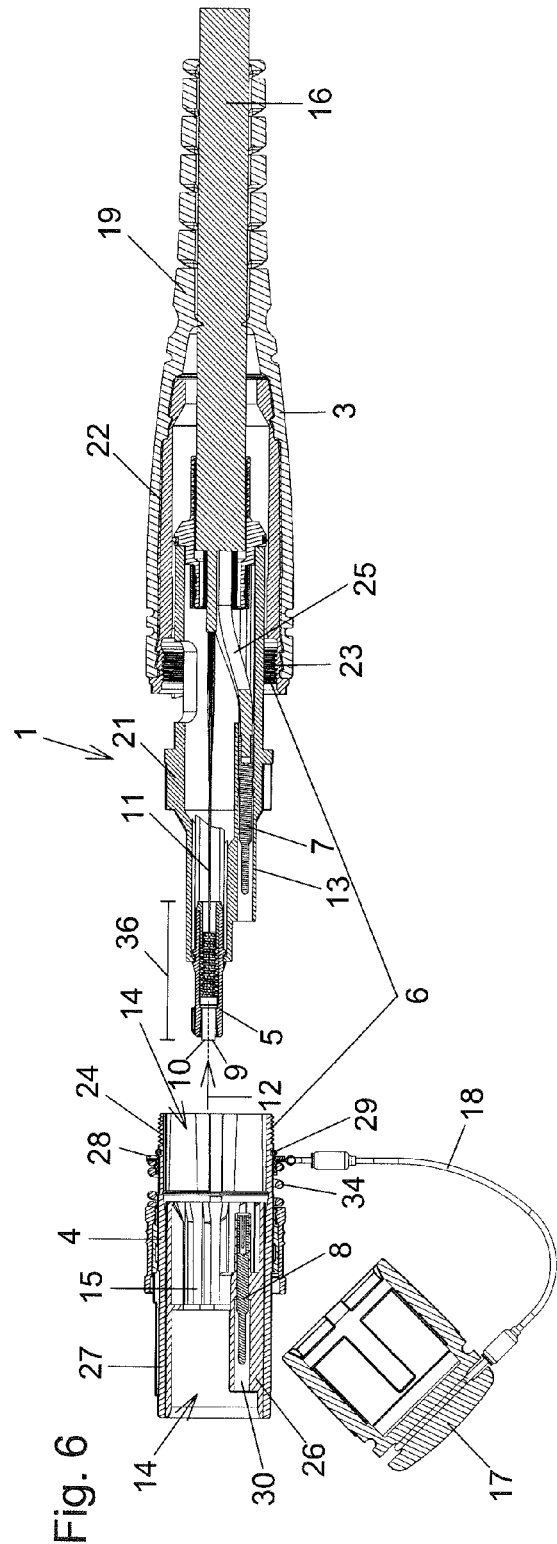

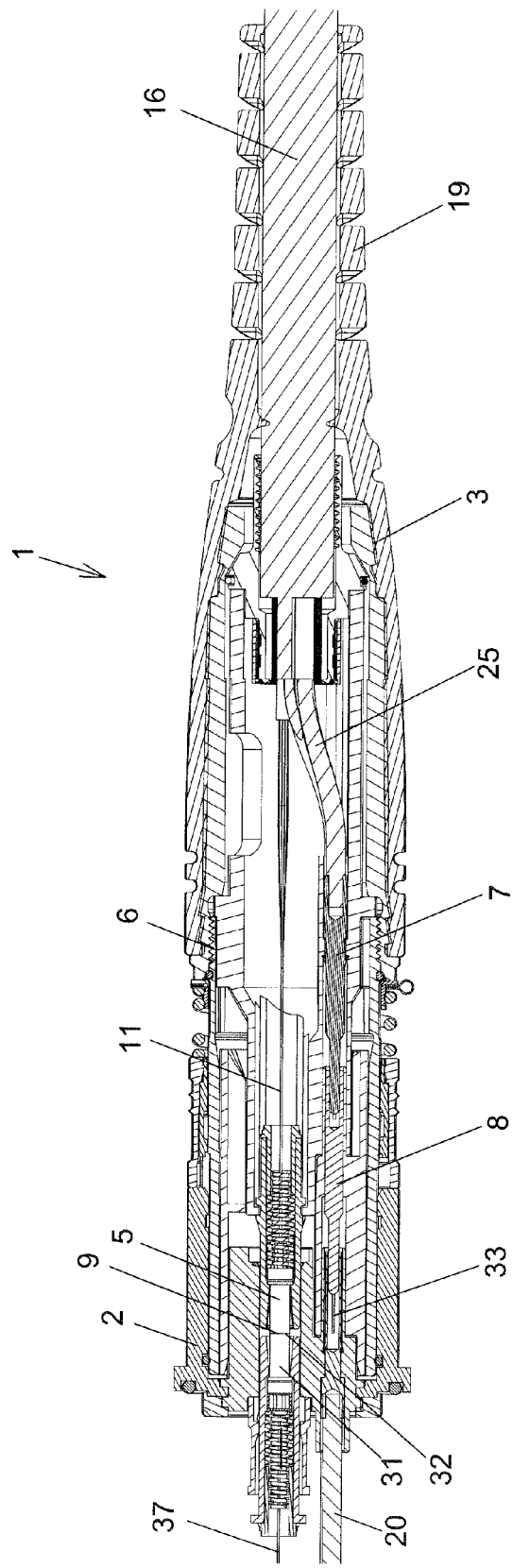

CONNECTOR

INCORPORATION BY REFERENCE

The following documents are incorporated herein by reference as if fully set forth: German Patent Application No. DE 10 2016 101 254.8, filed Jan. 25, 2016.

BACKGROUND

The present invention relates to a connector, in particular cable connector, for producing an optical and electrical connection to a mating connector, wherein the connector has a connector main housing and at least one housing attachment part and at least one optical waveguide carrier, and the housing attachment part is fastened or fastenable releasably to the connector main housing by means of a releasable and reconnectable connecting device.

Connectors of the above-mentioned type are used to connect cables, which have at least one optical waveguide for data transmission, to another cable or to a device, such as, for example, a television camera or film camera or the like. So that the data transmission over such optical connections functions beyond connector and mating connector, the open ends of the optical waveguides in the connector have to be able to be kept very clean and have to be able to be optionally cleaned. In the case of connectors of the type in question, it is known to release the housing attachment part from the connector main housing by the releasable and reconnectable connecting device in order to be able to separately clean the housing attachment part.

SUMMARY

It is the object of the invention to improve connectors of the abovementioned type to the effect that there is no risk that, when the housing attachment part is removed, electric contacts of the connector can be accidentally touched.

For this purpose, it is provided according to the invention in the case of connectors of the abovementioned type that the optical waveguide carrier and at least one electric contact are arranged on the connector main housing, and the housing attachment part has at least one electric extension contact which is connectable to the electric contact of the connector main housing by connection of the housing attachment part to the connector main housing.

Through the arrangement of at least one extension contact in the housing attachment part, the electric contact of the connector main housing, which electric contact is possibly still under operating voltage when the housing attachment part is removed, can be arranged concealed or further to the rear, and therefore, even in the removed state of the housing attachment part, there is not the risk that electric contacts of the connector main housing that is still live stand free or are touched. Free-standing electric contacts constitute the risk for a person undertaking the cleaning of suffering an electric shock or other injury therefrom.

In particularly preferred embodiments of the invention, the electric contact of the connector main housing is connectable to the electric extension contact of the housing attachment part by a plug-in connection. In other words, the electric contact and the electric extension contact can preferably be plugged directly or indirectly one in the other. This has the advantage of a simple and rapid connection since plug-in connections can be drawn together and also separated again very simply.

Particularly preferably, however, in the case of connectors according to the invention it is especially provided that a contact surface of the optical waveguide carrier, in which contact surface at least one open end of at least one optical waveguide of the connector leads, is arranged offset with respect to the electric contact of the connector main housing, as seen in a connecting direction in which the electric contact of the connector main housing is connectable to the electric extension contact of the housing attachment part. By the offset between the open end or the open ends or the contact surface of the optical waveguide carrier, on the one hand, and the electric contacts of the connector main housing, on the other hand, the contact surface of the optical waveguide carrier and therefore the open ends of the optical waveguides can be cleaned without running the risk of touching the electric contacts that are arranged offset with respect thereto. It is particularly preferably provided in this connection that the contact surface of the optical waveguide carrier protrudes further from the rest of the connector main housing than the electric contact of the connector main housing.

To the extent that components are referred to singularly in the claims and also in the above explanations, this is a purely linguistic simplification and does not exclude individual components of the connector according to the invention also being present in a number greater than one, in the sense of at least one or more than one. This applies in particular to the number of optical waveguides which are fastened to the optical waveguide carrier and lead at their open ends into the contact surface of the optical waveguide carrier. In the case of connectors according to the invention, a plurality of optical waveguides are generally fastened to the optical waveguide carrier and lead at their open ends into the abovementioned contact surface of the optical waveguide carrier.

Furthermore, however, connectors according to the invention may of course also be equipped with more than one housing attachment part and with more than one optical waveguide carrier, etc.

The open end of an optical waveguide is the end through which light can emerge from the optical waveguide and light can enter into the optical waveguide. The open end or the open ends of the optical waveguides in the contact surface can be equipped with or without lenses or other means for optical focusing or dispersal of light. The optical waveguide is an optically conducting fiber which is generally surrounded by a casing, apart from the open end or the open ends. Optical waveguides and casings together produce optical waveguide cables which are known per se in the prior art. The optical waveguides can consist, for example, of glass fibers or the like. The above-used term of an optical connection is a connection which is provided for optical data transmission. An electrical connection is a connection via which electric data or information can be exchanged and/or a power supply or voltage supply takes place.

A connector and also a mating connector are, generally speaking, means for producing a connection between at least two cables or at least one cable and a device. In the present case, the cables have one or more optical waveguides and one or more electric lines. The term mating connector has been introduced in order to be able to differentiate linguistically between connector and mating connector. The mating connector is a corresponding different connector, wherein the connector and the mating connector or other connectors can be brought together in a bringing-together direction or are connectable to one another in such a manner that the optical connection and also the electrical connection are produced. Both the connector according to the invention and the mating connector can be what is referred to as a chassis socket, which could also be called a device socket. Chassis sockets are known per se. They are those connectors which are attached to devices or to housings thereof. However, both the connector according to the invention and the mating connector can also be designed as what are referred to as cable connectors. Cable connectors are the connectors which are fastened to the above-mentioned cable. In order to connect two cables to each other, cable connectors are attached in each case to the two cables to be connected to each other. In order to connect a cable to a device or to the housing thereof, a chassis socket is generally attached to the device and a cable connector to the cable.

In general, the connectors could also be called plugs. When connector and mating connector are brought together, it would then also be possible to refer to this as plugging together. However, the connectors according to the invention and also the mating connectors corresponding thereto can be connected to one another not only by plugging one inside another but also by screwing together or other types of connections or combinations thereof.

The releasable and reconnectable connecting device with which the housing attachment part can be connected releasably to the connector main housing is a connecting device which is provided and designed in order for the connection produced by it to be able to be repeatedly released and restored. This therefore involves in particular a destruction-free type of release and reconnection. Particularly preferably, the releasable and reconnectable connecting device with which the housing attachment part is fastened releasably to the connector main housing is a screw connection which is known per se.

Alternatively, however, other releasable and reconnectable connecting devices which are known per se and are intended for fastening the housing attachment part to the connector main housing can also be realized in the invention. An example thereof which can be mentioned are bayonet catches or secured plug-in connections. Secured plug-in connections are those in which the plug-in connection can only be released again when a corresponding securing means is released. Bayonet catches are a connection in which the parts to be connected are plugged one in another and are subsequently rotated in an opposite direction to one another in order to be connected to one another. The release takes place by rotation and pulling apart in the correspondingly opposite directions.

All mentioned types of a connecting device, as seen by themselves, are known.

It is particularly preferably provided that the electric contact of the connector main housing and/or the electric extension contact of the housing attachment part are of pin-like design.

In order to make the connector according to the invention particularly operationally reliable, preferred embodiments of the invention provide that the electric contact of the connector main housing is arranged completely recessed within a sheath which is open, preferably exclusively, on the end side and is arranged on the connector main housing.

In preferred embodiments, the electric contact of the connector main housing and the electric extension contact of the housing attachment part are configured for electrical power transmission with operating voltages of 40 volts to 600 volts. In this connection, both direct current and alternating current are possible.

In preferred embodiments, the housing attachment part has a through channel which is open on its two end sides and in which the optical waveguide carrier is arranged in the interconnected state of connector main housing and housing attachment part.

Particularly preferred embodiments provide that the connector according to the invention is a cable connector and, as seen in the interconnected state of connector main housing and housing attachment part, a cable leads into the connector main housing on that side of the connector main housing which is opposite the housing attachment part.

The housing attachment part is preferably a protruding or male extension of the connector that, upon connection with the mating connector, penetrates into the latter or into a female socket of the mating connector.

BRIEF DESCRIPTION OF THE DRAWINGS

Further features and details of preferred variants of a connector according to the invention are explained below in the description of the figures with reference to an exemplary embodiment according to the invention of the connector. In the figures:

FIGS. 1 and 2 show perspective views of the exemplary embodiment of the connector according to the invention;

FIG. 4 shows an exploded illustration of the components of the exemplary embodiment according to the invention of a connector shown in the figures;

FIGS. 5 and 6 show longitudinal sections through the connector according to the invention, and FIG. 7 shows a longitudinal section through the connector according to the invention when the latter is connected to a mating connector.

DETAILED DESCRIPTION OF THE PREFERRED EMBODIMENTS

Figure 3:
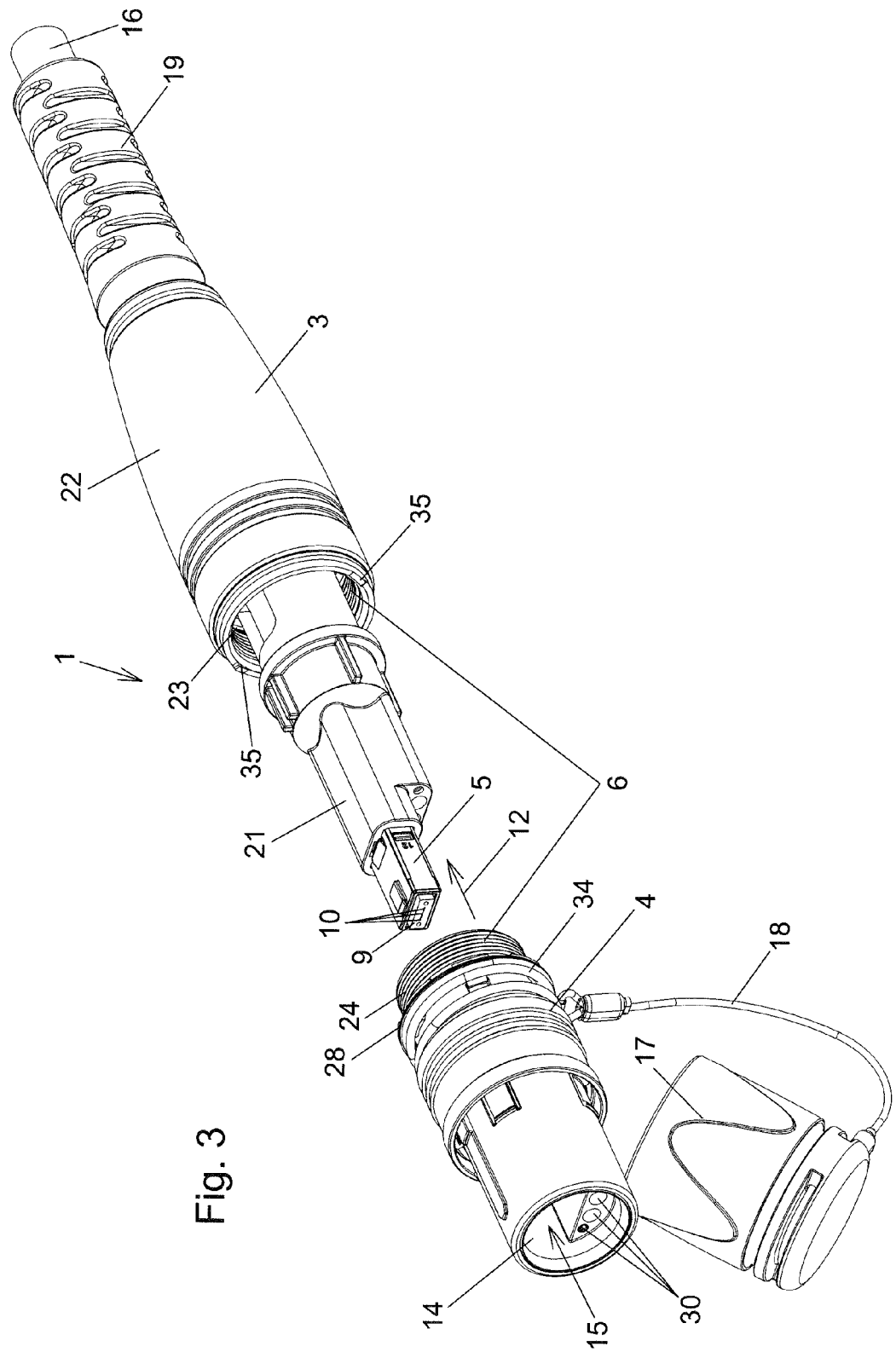
FIG. 3 shows a perspective view in which the housing attachment part is removed from the connector main housing.

FIGS. 1 and 2 illustrate the connector according to the invention in an operating position in which the housing attachment part 4 is fastened to the connector main housing 3 by the connecting device 6. On that side of the connector main housing 3 which is opposite the housing attachment part 4, the cable 16 leads through the cable bushing 19 into the connector main housing 3. The housing attachment part 4 forms a male extension which, in this exemplary embodiment, can be protected by a protective cap 17. The protective cap 17 is fastened captively to the housing attachment part 4 by a loss guard 18 which is in the manner of a cord here. In FIG. 1, the protective cap 17 is placed onto the male extension of the housing attachment part 4. In FIG. 2, the protective cap 17 is illustrated pulled off. As a result, in FIG. 2, the view is into the front open end of the housing attachment part 4. The contact surface 9 of the optical waveguide carrier 5 with the open ends 10 of the optical waveguides 11, which open ends are arranged in a row here, is seen there. The channels 30 in which the electric extension contacts 8 are located are arranged therebelow. This can be readily seen in detail especially in FIGS. 5 and 6 as are described further on.

FIG. 3 now illustrates the housing attachment part 4 released from the connector main housing 3 after release of the connecting device 6. The internal thread 23 on the connector main housing 3 and the external thread 24 on the housing attachment part 4 are readily seen here. These two threads 23 and 24 together form a screw connection which, in this exemplary embodiment, forms the releasable and reconnectable connecting device 6. Alternatively, however, as already explained at the beginning, other connection forms, such as, for example, a bayonet catch or a secured plug-in connection, could be used here in order to connect the housing attachment part 4 to the connector main housing 3 in a releasable and reconnectable manner. In the exemplary embodiment shown, this screw connection of the connecting device 6 is secured. For this purpose, in this exemplary embodiment, the securing studs 35 are arranged on the rear part 22 of the connector main housing 3. In the screwed-together state, the securing ring 28, which is particularly readily visible in FIG. 4, engages in said securing studs. If the screw connection is intended to be released, the securing ring 28 has to be pulled forward, i.e. away from the rear part 22 of the connector main housing 3, in such a manner that the securing studs 35 become disengaged from the securing ring 28. Only then can the rear part 22 of the connector main housing 3 be unscrewed, by rotation about its longitudinal axis, from the housing attachment part 4 in this exemplary embodiment. The securing ring 28 is pulled away from the rear part 22 of the connector main housing 3 by compression of the pretensioning spring 34 which pretensions the securing ring 28 in the direction of the securing studs 35.

In the position illustrated in FIG. 3, the housing attachment part 4 is pulled off from the connector main housing 3 counter to the connecting direction 12. By this arrangement, the optical waveguide carrier 5, which is arranged on the front part 21 of the connector main housing 3, has also been pulled, by the open ends 10 of the optical waveguides 11, out of the through channel 15 of the housing attachment part 4. The through channel 15 has open ends at each of its two opposite end sides 14, and therefore, when housing attachment part 4 and connector main housing 3 are joined together in connecting direction 12, the optical waveguide carrier 5 can penetrate into the through channel 15.

The individual components of the connector 1 according to the invention that is illustrated here can be seen readily in the exploded illustration according to FIG. 4. The electric lines 25 and the optical waveguide cables with the optical waveguides 11 lead out of the cable 16 which is guided through the cable bushing 19 and the rear part 22 of the connector main housing 3. The optical waveguides 11 are fastened in the optical waveguide carrier 5, their open ends 10 lead into the contact surface 9 of the optical waveguide carrier 5. The electric lines 25 lead into the electric contacts 7 of the connector main housing 3. In the exemplary embodiment shown, there are a total of four electric contacts 7 and correspondingly also four electric lines 25. Two thereof can serve, for example, for electric data transmission and another two thereof for electric power transmission. The front part 21 of the connector main housing is preferably comprised of electrically insulating material, such as, for example, plastic. In this exemplary embodiment, said part also bears the sheaths 13 of the electric contacts 7, as can be seen even better in the following figures or the sectional illustrations thereof.

It can readily also be seen in FIG. 4 that, in this exemplary embodiment, the housing attachment part 4 is also of multi-part design. The latter first of all has the insert 26 which can be manufactured, for example, from plastic or from another electrically insulating material. In this exemplary embodiment, the through channel 15 of the housing attachment part 4 with its respective open ends on the end sides 14 is also located in this insert 26. Furthermore, the channels 30 in which the electric extension contacts 8 are arranged are also located in the insert 26. The sealing ring 29 can be designed as known per se in the prior art. The casing 27 of the housing attachment part 4, which sheaths the insert 26 in the assembled state, can be formed, for example, from metal. The function of the securing ring 28 and of the pretensioning spring 34 pretensioning the latter has already been explained further above.

FIGS. 5 and 6 show longitudinal sections through the connector 1 according to the invention of this exemplary embodiment. In FIG. 5, the housing attachment part 4 is connected to the connector main housing 3 by the connecting device 6. In FIG. 6, the connecting device 6 has been released and the housing attachment part 4 has been pulled off from the connector main housing 3 counter to the connecting direction 12.

In this exemplary embodiment, the electric contacts 7 of the connector main housing 3 are connected to the electric extension contacts 8 in the housing attachment part 4 via a plug-in connection in the position according to FIG. 5. It can be particularly readily seen in FIGS. 5 and 6 how, according to the invention, the optical waveguide carrier 5 and the electric contacts 7 are arranged on the connector main housing 3 and the housing attachment part 4 has the electric extension contacts 8 which are connectable to the electric contacts of the connector main housing 3 by connection of the housing attachment part 4 to the connector main housing 3. It can also be readily seen in FIG. 6 that the electric contact surface 9 of the optical waveguide carrier 5, into which contact surface the open ends 10 of the optical waveguides 11 of the connector 1 lead, are arranged offset with respect to the electric contacts 7, as seen in the connecting direction 12. The offset is identified in FIG. 6 by the reference sign 36. It can also be readily seen in FIG. 6 how the contact surface 9 of the optical waveguide carrier 5 protrudes further from the rest of the connector housing 3 than the electric contact 7 of the connector main housing 3. Furthermore, it can also be readily seen that the electric contacts 7 of the connector main housing 3 are arranged completely recessed within the sheath 13 which is open exclusively in the end side and is arranged on the connector main housing 3. In the separated position of connector main housing 3 and housing attachment part 4 that is illustrated in FIG. 6, the contact surface 9 and therefore the open ends 10 of the optical waveguides 11 can be cleaned without the person undertaking said cleaning running the risk of suffering an electric shock on the electric contacts 7 or being injured in some other way.

FIG. 7 likewise shows a longitudinal section, wherein the connector 1 according to the invention of the previously described exemplary embodiment is connected here, however, to a corresponding mating connector 2. The mating connector 2 here is a chassis socket into which the male extension of the housing attachment part 4 is pushed in order to produce the connection. In the connecting position illustrated, the electric contacts 7 of the connector main housing 3 are in electrically conductive connection with corresponding electric contacts 33 of the mating connector 2 via the electric extension contacts 8. The optical waveguide carrier 5 of the connector main housing 3 lies directly with its contact surface 9 against a contact surface 32 of an optical waveguide carrier 31 of the mating connector 2. By this arrangement, the open ends 10 of the optical waveguides 11 of the connector 1, which open ends are arranged in the contact surface 9, come into light-conducting connection with corresponding open ends of optical waveguides 37 of the mating connector 2, and therefore optical signals can be transported to and fro via said connection. The electric lines 25 of the connector 1 are electrically conductively connected to the electric lines 20 of the mating connector 2 via the electric contacts 7, the electric extension contacts 8 and the electric contacts 33.

For the sake of completeness, it is also pointed out that the protective cap 17 and the loss guard 18 are not illustrated in FIG. 7.

KEY TO THE REFERENCE NUMBERS

| | |
|---|---|
| 1 | Connector |
| 2 | Mating connector |
| 3 | Connector main housing |
| 4 | Housing attachment |
| 5 | Optical waveguide carrier |
| 6 | Connecting device |
| 7 | Electric contact |
| 8 | Electric extension contact |
| 9 | Contact surface |
| 10 | Open end |
| 11 | Optical waveguide |
| 12 | Connecting direction |
| 13 | Sheath |
| 14 | End side |
| 15 | Through channel |
| 16 | Cable |
| 17 | Protective cap |
| 18 | Loss guard |
| 19 | Cable bushing |
| 20 | Electric line |
| 21 | Front part |
| 22 | Rear part |
| 23 | Internal thread |
| 24 | External thread |
| 25 | Electric line |
| 26 | Insert |
| 27 | Casing |
| 28 | Securing ring |
| 29 | Sealing ring |
| 30 | Channel |
| 31 | Optical waveguide carrier |
| 32 | Contact surface |
| 33 | Electric contact |
| 34 | Pretensioning spring |
| 35 | Securing stud |
| 36 | Offset |
| 37 | Optical waveguide |

The invention claimed is:

1. A connector for producing an optical and electrical connection to a mating connector, the connector comprising: a connector main housing, at least one housing attachment part, at least one optical waveguide carrier, a releasable and reconnectable connecting device to fasten or fasten releasably the housing attachment part to the connector main housing, the optical waveguide carrier and at least one electric contact are arranged on the connector main housing, and the housing attachment part has at least one electric extension contact that is connectable to the electric contact of the connector main housing by connection of the housing attachment part to the connector main housing, and the at least one electric contact of the connector main housing is arranged completely recessed within a sheath which is open on an end side and is arranged on the connector main housing.

2. The connector according to claim 1, wherein the at least one electric contact of the connector main housing is connectable to the at least one electric extension contact of the housing attachment part by a plug-in connection.

3. The connector according to claim 1, wherein the optical waveguide carrier includes a contact surface to which at least one open end of at least one optical waveguide of the connector leads, said contact surface is arranged offset with respect to the at least one electric contact of the connector main housing, as seen in a connecting direction in which the at least one electric contact of the connector main housing is connectable to the at least one electric extension contact of the housing attachment part.

4. The connector according to claim 3, wherein the contact surface of the optical waveguide carrier protrudes further from a remainder of the connector main housing than the at least one electric contact of the connector main housing.

5. The connector according to claim 1, wherein at least one of the at least one electric contact of the connector main housing or the at least one electric extension contact of the housing attachment part is a pin connector.

6. The connector of claim 1, wherein the sheath is open exclusively on the end side.

7. The connector according to claim 1, wherein the housing attachment part has a through channel which is open on two end sides thereof and in which the optical waveguide carrier is arranged in an interconnected state of connector main housing and housing attachment part.

8. The connector according to claim 1, wherein the at least one electric contact of the connector main housing and the at least one electric extension contact of the housing attachment part are configured for electrical power transmission with operating voltages of 40 volts to 600 volts.

9. The connector according to claim 1, wherein the releasable and reconnectable connecting device for fastening the housing attachment part to the connector main housing comprises at least one of a screw connection, a secured plug-in connection, or a bayonet catch.

10. The connector according to claim 1, wherein the connector is a cable connector and, as seen in an interconnected state of connector main housing and the housing attachment part, a cable leads into the connector main housing on a side of the connector main housing which is opposite to the housing attachment part.

* * * * *